Oct. 18, 1932.   C. B. GRAY   1,883,713
TOOL HOLDER
Filed Nov. 25, 1930
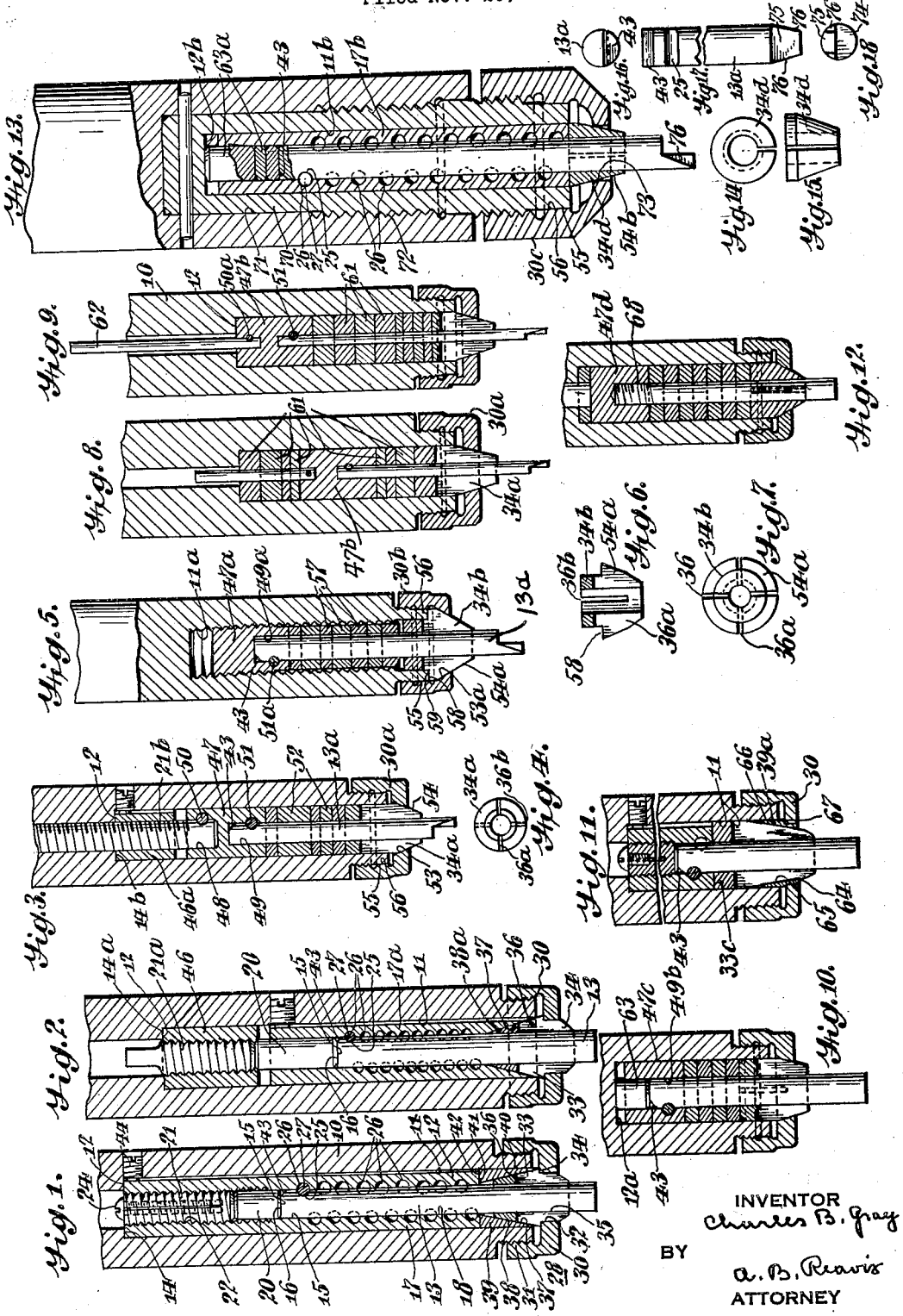
INVENTOR
Charles B. Gray
BY
A. B. Reavis
ATTORNEY Patented Oct. 18, 1932

1,883,713

UNITED STATES PATENT OFFICE

CHARLES B. GRAY, OF MILLBOURNE, PENNSYLVANIA

TOOL HOLDER

Application filed November 25, 1930. Serial No. 497,988.

My invention relates to cutting machines of the punch type having a reciprocatory ram and a tool and it has for an object to provide improved connections between the ram and the tool adequate for the transmission of cutting stress to the tool, for stripping the tool from work, for positively centering the cutting end of the tool, and for axial adjustment of the tool with respect to the ram.

In accordance with my invention, the ram, or ram construction, is provided with an axial bore within which is disposed the punch tool. Abutment means is arranged in the bore and abuts the top of the tool, and such means is adjustable to take care of variation in tool length. On its working stroke, thrust is transmitted from the ram, through the adjustable abutment means, to the top of the tool. A separate connection is provided between the ram and the tool so that the latter may be stripped from stock on back strokes. The shank of the tool is surrounded by spacing means fitting the ram bore and serving to resist buckling of the tool. A centering device is provided at the lower end of the ram to assure alinement of the tool with the die even though the tool is turned about its axis. A further object of my invention is to provide an improved ram and tool connection construction having these advantageous features.

These and other objects are effected by my invention as will be apparent from the following specification taken in connection with the accompanying drawing in which:

Fig. 1 is a sectional view of my improved construction showing the tool in elevation;

Fig. 2 is a sectional view showing a modified form;

Figs. 3 to 10, inclusive, are sectional views showing further modified forms wherein the tools are provided with heads;

Fig. 11 is a sectional view of a modified construction somewhat like Fig. 1;

Fig. 12 is a sectional view showing a further modified form of head construction;

Fig. 13 is a sectional view showing a ram construction including an adapter;

Figs. 14 and 15 are detail views of the collet used with the construction of Fig. 13; and Figs. 16, 17 and 18 are detail views of an improved tool.

Referring now to the drawing more in detail, in Fig. 1, I show a ram 10 having an axial bore 11 provided with an upper abutment 12. A punch tool 13 is disposed within the bore. Adjustable spacing means is also disposed within the bore, such spacing means having an abutment surface 14 abutting the bore abutment 12 and an abutment surface 15 abutting the upper end 16 of the tool. The distance between the abutment surfaces is varied to take care of variation in tool length, this being particularly desirable where the cutting end of the tool is sharpened or dressed. To this end, in Fig. 1, a sleeve 17 fits within the bore 11 and the sleeve is provided with a bore 18 within which is arranged the tool. One or more spacing members 20, for example, one, are arranged in the bore 18 between the upper end 16 of the tool and a backing screw 21 threaded in the upper end of the bore as shown at 22. The backing screw 21 is split and has an expansion screw 24 for locking the backing screw in adjusted position.

On working strokes, thrust is transmitted from the ram abutment, through the adjustable spacing means, including the sleeve 17, the backing screw 21 and the spacer 20, to the top of the tool 13.

On back strokes of the ram 10, it is necessary to strip the tool from the stock. To this end, the sleeve 17 is held in place with its upper end 14 pressed against the abutment 12 by collet mechanism, hereinafter referred to, and the sleeve is connected to the upper portion of the tool at one side, the tool and the sleeve having a notch 25 and an opening 26, respectively, which complementally form an opening for the tangent stripping pin or key 27. To provide for axial adjustment of the tool 13 relative to the sleeve 17, the latter is provided with a plurality of staggered openings 26 with any of which the notch 25 may be caused to register.

Collet mechanism, at 28, is carried by the lower end of the ram and it serves to hold the sleeve 17 in place under compression and to center the cutting end of the tool 13. The collet mechanism includes a nut 30 threaded to the ram at 31, and the nut has an opening 32 within which is arranged the lower portion of the collet 33 so that the nut engages underneath the collet shoulder 34. The collet 33 has a bore 35 for the tool 13 and it is split, as shown at 36. The upwardly-tapering, external, conical surface 37 of the collet fits within the internal conical surface 38 of the split ring 39 having an external cylindrical surface 40 for expansion against the ram bore wall and having an upper abutment surface 41 engaging the lower abutment surface 42 of the sleeve 17. As the nut 30 is screwed up, the split ring 39 is moved up to cause the pairs of abutment surfaces 41, 42 and 14, 12 to engage under pressure; and then, with axial movement of the ring 39 arrested on this account, the collet 34 causes the ring to expand to fit tightly within the ram bore. As the internal conical surface 38 is coaxial with the external cylindrical surface 40 and, therefore, with the ram, and as the external conical surface 37 of the collet is coaxial with the bore 35 thereof, continued tightening of the nut 30 results in centering of the lower end of the tool and gripping thereof.

On back strokes of the ram 10, stress is transmitted from the ram, through the collet mechanism at 28, to the sleeve 17, and from the latter, through the stripping pin 27, to the tool 13 to strip the latter from stock.

The top of the tool is bevelled at 43 above the stripping pin notch 25 so that thrust is exerted back of the notch and on a straight line to the cutting end of the tool. Without the bevel, a part of the thrust would be over the notch and the moment arm over the stripping pin would tend to cause breakage of the tool at the notch because of pressure on the portion overhanging the stripping pin and the notched portion being the weakest section of the tool. The bevel avoids such pressure effects.

A screw 44 is preferably carried by the ram to hold the sleeve 17 against turning incident to tightening of the collet mechanism.

The ram construction of Fig. 1, therefore, transmits working thrust or stress from the abutment 12, through the adjustable spacing means, to the top of the tool; and stripping stress is transmitted from the ram and the connected collet mechanism, at 28, to the sleeve 17, and, from the latter, through the stripping pin, to the upper portion of the tool. The staggered openings 26 in the sleeve provide for axial adjustment of the tool, spacing means 20 of suitable length being provided and the backing screw 21 being screwed down to remove all looseness. The sleeve 17 also functions as spacing means between the ram bore and the tool to prevent buckling of the latter on working or cutting strokes. The collet mechanism serves not only to remove any looseness or end-play of the sleeve 17 with respect to the ram but also to center and to grip the lower portion of the tool. These features provide adequate stress transmitting connections, centering of the cutting end of the tool, and the location of the cutting end of the tool quite close to the lower end of the ram, the latter result being important in that the tool overhang with respect to the ram or the column length below the ram is minimized to give maximum tool strength and avoid deflection.

Fig. 2 is similar to Fig. 1 except that the spacing means is formed separately from the holder or sleeve 17a and the collect mechanism is slightly different. The spacing means is comprised by the sleeve 46, formed separately from and spaced a short distance above the tool sleeve or holder 17a, the backing screw 21a threaded to the sleeve 46, and the spacer or spacers 20 of suitable length. The upper end surface 14a of the sleeve 46 abuts the ram abutment 12. The spacer 20 abuts the top surface of the tool.

The tool 13 is connected to the sleeve 17a by a stripping pin 26, as in Fig. 1. The sleeve 17a has its lower end formed with an upwardly-tapering, internal conical surface 38a, which is coaxial with the cylindrical surface of the sleeve 17a and with the ram and the bore 11 of the latter. The collet 34 has upwardly-tapering, external conical surface 37 fitting the surface 38a, the collet conical surface being coaxial with its bore 35. As the collet nut 30 is screwed up, thrust is first transmitted from the conical surface 37 to the conical surface 38a, causing the sleeve 17a and the tool 13 to move up sufficiently for the top surface 15 of the tool to abut with the abutment surface 16 of the spacing means, the spacer 20 abutting the backing screw 21a and the latter causing the sleeve 46 to abut with the ram abutment 12. After all play is taken up in this way, continued screwing up of the nut 30 results in centering and gripping of the lower end of the tool. If the threads of the sleeve 46 should be stripped, such sleeve can be replaced without making it necessary to replace the sleeve 17a provided with the staggered openings for the stripping pin and with the lower conical surface.

In Fig. 3, I show a further modified form of my invention wherein the adjustable spacing means is arranged between the ram abutment 12 and the top surface of the tool, axial adjustment being secured by operating the backing screw 21b. A tool holder or head 47 is connected to the backing screw and to the upper end of the tool 13a, the holder or head 47 having upper and lower bores 48 and 49 having arranged therein the lower end of the backing screw and the upper end of the tool, respectively. Tangent pins or keys 50 and 51 connect the backing screw and the tool to the holder or head. Washers 52 of variable thickness fitting about the tool 13a and within the ram bore are arranged between the holder or head and the collet mechanism. As the holder or head 47 is formed separately from the tool, manufacture of the latter, particularly grinding of the latter from round stock, is simplified.

The collect mechanism of Fig. 3 includes a nut 30a having a downwardly-tapering, internal conical surface 53 fitting the downwardly-tapering, external conical surface 54 of the collet 34a. The collet nut 30a has an internal cylindrical surface 56 coaxial with the conical surface 53 and fitting the ram cylindrical surface 55.

As the collet nut 30a is screwed up, the collet 34a is caused to abut the lowermost washer 52 and thrust is transmitted through the washers to the holder or head 47, from the latter to the backing screw 21b, from the backing screw to the sleeev 46a, and from the latter to the ram abutment 12, whereby all looseness or end-play is taken out. Adjustment of the tool relatively to the ram is provided for by choice of washers 52 so that the tool depends below the ram to a desired extent, and the sleeve 46a is adjusted along the backing screw suitably to the length of tool.

On working strokes of the ram, thrust is transmitted from the ram abutment, through the adjustable spacing means, to the top of the tool; and, on back strokes of the ram, stress is transmitted from the ram to the collet mechanism, through the spacing washers to the head or holder 47, and from the latter through the stripping pin 51 to the tool. As before, the collet mechanism also centers and grips the lower portion of the tool, the coaxial conical and cylindrical surfaces 53, 54, 55, and 56 assuring centering.

In Fig. 5, the ram 10 is provided with a threaded bore 11a and modified adjustable spacing means is arranged between the top of the tool 13a and the ram, the spacing means consisting of a head or holder 47a threaded to the bore 11a, having a lower bore 49a receiving the upper end of the tool, and being connected to the upper portion of the tool by the stripping pin 51a. Floating washers 57 are arranged about the tool and in the ram bore to resist buckling of the tool. A collet nut 30b is threaded to the lower end of the ram, engaging cylindrical centering or pilot surfaces 55 and 56 are provided on the ram and the nut, downwardly-tapering conical surfaces 53a and 54a are provided on the nut 30b and the collet 34b, respectively, and the collet has an abutment shoulder 58 engaging the lower end of the ram. The cylindrical surfaces 55 and 56 of the ram and the collet nut and the conical surface 53a of the nut are coaxial with the ram, the conical surface 54a and the bore 35 of the collet 34b are co-axial, and the tool is disposed in the collet bore, whereby, when the collet nut 30b is screwed up, the tool is centered and gripped and the head and tool assembly is prevented from turning in the ram bore.

In Figs. 8 and 9, a head or holder 47b is arranged in the ram bore and it is connected to the tool 13a and to a rod 62 by the keys or pins 51 and 50a, respectively, and adjustment is secured by placing washers 61 of suitable thicknesses below the head (Fig. 9), above the head, or both above and below the head (Fig. 8) depending on the tool length. When the length of the tool is a maximum, all of the washers 61 are arranged below the head, as shown in Fig. 9; and, as the tool is shortened due to sharpening, washers are removed from below the head and placed thereabove (Fig. 8) until finally, with the shortest tool length, all the washers are located above the head. The collet nut serves, as heretofore, to remove end play and then to center and grip the lower portion of the tool.

Fig. 10 is somewhat like Fig. 3, except that the holder or head 47c of Fig. 10 is provided with a bore 49b which accommodates both the upper portion of the tool and the lower portion of the spacer 63, the upper end of the latter engaging the ram abutment 12a. In this form, adjustably spacing of the tool relatively to the ram abutment is secured by the use of a spacer or spacers 63 of suitable length.

Fig. 11 is similar to Fig. 1, except for modification of the collet mechanism. In Fig. 11, the lower end of the collet 33c is downwardly-tapered at 64 and the sleeve or ring 39a has a downwardly-tapering, internal conical surface 65 fitting the surface 64 and an external cylindrical surface 66 fitting the interior of the ram bore. The ring or sleeve has an abutment 67 engaged by the collet nut 30.

Fig. 12 is similar to Figs. 8 and 9 except that the upper end of the tool is threaded to the holder or head 47d as shown at 68.

In Fig. 13, I show a ram construction embodying an adapter 70 fitting the bore 71 of the ram proper and being connected thereto by the screw threads 72. The adapter and the ram constitute a ram construction in this modification, since the adapter is virtually a part of the ram, and the term "ram construction" is used herein in a general sense to refer to a ram with or without an adapter.

The adapter 70 has a bore 11b within which is arranged a sleeve 17b connected to the tool as in Figs. 1 and 2. The upper end of the sleeve 17b is spaced a short distance from the abutment 12b and adjustable spacing means 63a contacts with the upper end of the tool, protrudes from the upper end of the sleeve, and contacts with the abutment 12b. The collet mechanism is similar to that shown in Fig. 3 except that the collet nut 30c has a rounded interior annular surface 73 engaging the external, downwardly-tapering conical surface 54b of the collet 34d.

In Figs. 16, 17 and 18, I show my preferred form of punch tool suitable for nibble cutting. The cutting edge 74 is approximately semi-circular (Fig. 18). A depending pilot 75 is disposed back of the cutting edge 74 and it is reduced in cross-section downwardly in order to obtain more proficient performance with harder and tougher alloys now being produced. This form of pilot is produced by removal of stock for a suitable length and far enough back of the center of the round section to provide for progressive overlapping of the cutting edge of the tool with respect to stock being cut. Overlapping feed is limited by the edges 76 of the pilot contacting with a previous semi-circular cut. The front face of the pilot is spaced backwardly with respect to the cutting edge so that room is allowed for the spread of a slug under pressure of the cutting action so that the slug will not bear on the pilot front face with such force as to cause gripping between the slug and the pilot and crowding of the tool excessively against the die or over the cutting edge of the die. The sides 76 of the pilot are tapered downwardly to provide for freeing of the pilot more readily if a slug should spread and wedge between the pilot and the die. Furthermore, the tapered sides provide more room for slug spreading at the sides. On up-strokes, the tool picks the stock up until the latter reaches the stripper, and the stock may tip so that one side is higher than the other, in which case, if a straight-sided pilot is used, excessive gripping of the pilot on account of friction may take place with the result that, as the pilot is of weaker section than the tool, it may be broken off. On the other hand, with a pilot having tapered sides, even though the stock should tilt, the sides of the kerf would not tend to grip but the pilot tends to release itself. This feature is of importance particularly where cutting tough and sticky alloys which tend to stick or gald to the tool or pilot. A tool having these features of construction is more particularly disclosed and claimed in my application Serial No. 465,310, filed July 2, 1930.

From the foregoing, it will be apparent that I have provided an improved ram and tool construction particularly suitable for a nibbling machine. On working strokes, thrust is transmitted from the ram, through spacing means, to the top of the tool. Separate means including collet mechanism and a stripping pin connection serves to transmit stress from the ram to the tool to strip the latter from stock; and the collet mechanism also serves to secure pressure contact of the abutting surfaces which are active in transmitting working or cutting thrust to the tool. In addition the collet mechanism provides for centering and gripping of the lower end of the tool to assure alinement thereof with the die. Bevelling of the top of the tool above the stripping pin minimizes the possibility of breakage of the tool at the pin notch. The tool is reinforced throughout the length thereof in the ram against buckling. The tool may be readily disconnected for replacement or dressing, the spacing means being adjustable to properly position the cutting end. Furthermore, the cutting end of the tool may be located quite close to the lower end of the ram, thereby minimizing the tool overhang and the possibility of deflection thereof below the ram.

What I claim is:

1. In a cutting machine of the reciprocatory punch type, a ram construction having an axial bore, a punch tool in the bore, abutment means in the bore and abutting the thrust end of the tool and operatively connected to the ram construction for transmitting working thrust from the latter to the thrust end of the tool, means providing for axial adjustment of said abutment means suitably to the tool length, means providing a connection between the ram construction and the tool for stripping the latter from work, collet mechanism carried by the lower end of the ram construction for gripping and centering the tool, said mechanism including a collet disposed about the tool and having an external conical surface and means for contracting the collet including an annular member having a surface engaging the conical surface of the collet and coaxial with an annular member cylindrical surface engaging a cylindrical surface formed on the ram construction and coaxial with the latter, and spacing means encompassing the tool between the stripping connection and the collet and fitting the bore to resist buckling of the tool in the bore.

2. In a cutting machine of the reciprocatory punch type, a ram construction having an axial bore, a punch tool in the bore, abutment means in the bore and abutting the upper end of the tool and operatively connected to the ram construction for transmitting thrust from the latter to the tool, means providing for axial adjustment of said abutment means suitably to the tool length, a notch formed in the tool adjacent to the upper end, a key carried by the ram construction and engaging in said notch, the top end of the tool being bevelled directly above the notch to relieve the portion of the tool between the notch and the upper end from thrust stress, collet mechanism carried by the lower end of the ram construction for gripping and centering the tool, said mechanism including a collet disposed about the tool and having an external conical surface and means for contracting the collet including an annular member having a surface engaging the conical surface of the collet and coaxial with an annular member cylindrical surface engaging a cylindrical surface formed on the ram construction and coaxial with the latter, and spacing means encompassing the tool between the stripping connection and the collet and fitting the bore to resist buckling of the tool in the bore.

3. In a cutting machine of the reciprocatory type, a ram construction having an axial bore with a downwardly-facing abutment at its upper end, a tool in the bore and having an upper thrust abutment end, spacing means in the bore and having an upper abutment engaging the ram construction abutment and a lower abutment engaging the tool thrust abutment, means providing for adjustment of the spacing means to vary the distance between its upper and lower abutments, collet mechanism carried by the lower end of the ram construction for gripping and centering the lower end of the tool, said mechanism including a collet disposed about the tool and having an external conical surface and means for contracting the collet including an annular member having a surface engaging the conical surface of the collet and coaxial with an annular member cylindrical surface engaging a cylindrical surface formed on the ram construction and coaxial with the latter, a stripping connection between the ram construction and the upper end of the tool, and spacing means encompassing the tool between the stripping connection and the collet mechanism and fitting the bore to resist buckling of the tool in the bore.

4. In a cutting machine of the reciprocatory type, a ram construction having an axial bore provided with a downwardly-facing abutment, a tool in the bore, adjustable spacing means between the tool and said abutment and including a sleeve abutting said abutment and a screw threaded in the sleeve for transmitting thrust from the ram construction to the tool, collet mechanism carried by the lower end of the ram construction for gripping and centering the lower end portion of the tool, said mechanism including a collet disposed about the tool and having an external conical surface and means for contracting the collet including an annular member having a surface engaging the conical surface of the collet and coaxial with an annular member cylindrical surface engaging a cylindrical surface formed on the ram construction and coaxial with the latter, a stripping connection between the upper end portion of the tool and the ram construction, and spacing means encompassing the tool between the stripping connection and the collet mechanism and fitting the bore to resist buckling of the tool in the bore.

5. The combination as claimed in claim 4 with spacing means between the top of the tool and the bottom end of the screw.

6. The combination as claimed in claim 4 with means responsive to tightening of the collet mechanism to cause the sleeve to abut the bore abutment under pressure.

7. In a cutting machine of the reciprocatory type, a ram construction having an axial bore with a downwardly-facing abutment at its upper end; a tool in the bore and having an upper thrust abutment; a sleeve fitting the bore, abutting said abutment, and having a bore coaxial with the ram construction for said tool; tool abutment means in the sleeve and including a backing screw; means for connecting the tool to the sleeve including a plurality of openings distributed longitudinally of the sleeve and a notch in the tool adapted to be registered with any one of the openings and a pin arranged to fit an opening and the notch when in registry; collet mechanism carried by the lower end of the ram construction for urging the sleeve against the ram bore abutment and centering and gripping the lower end of the tool; said mechanism including a collet disposed about the tool and having an external conical surface and means for contracting the collet including an annular member having a surface engaging the conical surface of the collet and coaxial with an annular member cylindrical surface engaging a cylindrical surface formed on the ram construction and coaxial with the latter, and spacing means encompassing the tool between the stripping connection and the collet mechanism and fitting the bore to resist buckling of the tool in the bore.

8. In a cutting machine of the reciprocatory type a ram construction having an axial bore with a downwardly-facing abutment at its upper end, a sleeve fitting the bore and having a bore coaxial with the ram construction and its bore, the upper end of the sleeve being spaced from the ram bore abutment, a tool in the sleeve bore, means for connecting the tool to the sleeve including a plurality of transverse openings distributed longitudinally of the sleeve and a notch in the tool adaped to be registered with any one of the openings and a transverse pin arranged to fit an opening and the notch when in registry, spacing means disposed in the sleeve bore and engaging said ram bore abutment and the top of the tool, collet mechanism carried by the lower end of the ram construction for centering and gripping the lower end of the tool, said mechanism including a collet disposed about the tool and having an external conical surface and means for contracting tre collet including an annular member having a surface engaging the conical surface of the collet and coaxial with an annular member cylindrical surface engaging a cylindrical surface formed on the ram construction and coaxial with the latter, and spacing means encompassing the tool between the stripping connection and the collet mechanism and fitting the bore to resist buckling of the tool in the bore.

9. In a cutting machine of the reciprocatory type, a ram construction having a bore, a tool in the bore and provided with a head at its upper end, means for transmitting thrust from the ram construction to the upper end of the tool and providing for adjustment of the tool axially of the bore, collet mechanism carried by the lower end of the ram construction for gripping and centering the lower end of the tool, and spacing means fitting the bore between the head and the collet mechanism and fitting the tool shank to resist buckling of the latter.

10. The combination as claimed in claim 9 wherein the thrust transmitting means embodies adjustable spacing means and the spacing means between the head and the collet mechanism is adjustable.

11. The combination as claimed in claim 9 wherein the means for transmitting thrust from the ram construction to the upper end of the tool embodies a plurality of superposed washers and the spacing means between the head and the collet mechanism also embodies a plurality of superposed washers.

12. In a cutting machine, a ram, a punch tool, cutting stroke connecting means between the ram and the tool including an abutment engaging the top end of the tool and subjecting the latter to compressive stress on cutting strokes, and stripping connecting means between the ram and the tool including complementary recesses formed in the tool and in an element carried by the ram and a pin engaging in the complementary recesses, the top end of the tool being relieved above the recess therein so that the portion of the tool above the recess is not subjected to compressive stress on cutting strokes.

In testimony whereof, I have hereunto subscribed my name this 20th day of Nov. 1930.

CHARLES B. GRAY.

DISCLAIMER 1,883,713.—*Charles B. Gray*, Millbourne, Pa. TOOL HOLDER. Patent dated October 18, 1932. Disclaimer filed April 27, 1933, by the patentee.

Hereby disclaims from claims 9, 10, and 11 all tools of the headed type, said claims being hereby restricted to tools of substantially uniform cross sectional area from end to end, except for limited portions of smaller area, and telescopically arranged with respect to stripping sleeves, the telescoping portions of the tools and of the sleeves having lateral stripping connections and the ends of the tools remote from the cutting ends providing cutting thrust abutment surfaces.

[*Official Gazette May 30, 1933.*]